I

US008412824B1

(12) United States Patent
Schiff

(10) Patent No.: US 8,412,824 B1
(45) Date of Patent: Apr. 2, 2013

(54) SYSTEMS AND METHODS FOR DYNAMICALLY MANAGING THE MIGRATION OF A SINGLE INSTANCE OF DATA BETWEEN STORAGE DEVICES

(75) Inventor: Daniel Schiff, Reading (GB)

(73) Assignee: Symantec Corporation, Mountain View, CA (US)

( * ) Notice: Subject to any disclaimer, the term of this patent is extended or adjusted under 35 U.S.C. 154(b) by 563 days.

(21) Appl. No.: 12/548,711

(22) Filed: Aug. 27, 2009

(51) Int. Cl.
*G06F 15/173* (2006.01)

(52) U.S. Cl. ........................ 709/225; 711/118

(58) Field of Classification Search .......... 709/225; 711/118
See application file for complete search history.

(56) References Cited

U.S. PATENT DOCUMENTS

| | | | | |
|---|---|---|---|---|
| 4,933,837 | A * | 6/1990 | Freidin | 711/125 |
| 5,136,696 | A * | 8/1992 | Beckwith et al. | 712/240 |
| 5,555,379 | A * | 9/1996 | Silla | 711/3 |
| 5,581,730 | A * | 12/1996 | Silla | 711/144 |
| 6,701,359 | B1 * | 3/2004 | Calabrez et al. | 709/223 |
| 7,209,941 | B2 * | 4/2007 | Furusawa et al. | 709/202 |
| 7,350,206 | B2 * | 3/2008 | Singhal | 717/176 |
| 7,398,364 | B2 * | 7/2008 | Maruyama et al. | 711/162 |
| 7,454,592 | B1 | 11/2008 | Shah et al. | |
| 7,650,376 | B1 * | 1/2010 | Blumenau | 709/203 |
| 8,230,170 | B2 * | 7/2012 | Chien et al. | 711/114 |

OTHER PUBLICATIONS

Website: http://documentation.commvault.com/commvault/release_7_0_0/books_online_1/english_us/features/single_instance/single_instance.htm, *Single Instance Storage (SIS)*, Nov. 4, 2009 (6 pgs.).
Website: http://searchexchange.techtarget.com/tip/0,289483,sid43_gci1215648,00.html, *SearchExchange.com*, Nov. 4, 2009 (3 pgs.).
Website: http://windowsitpro.com/windowssecurity/article/articleid23819/whatever-happened-to-single-instance-storage-in-exchange.html, *Whatever Happened to Single-Instance Storage in Exchange?*, Nov. 4, 2009 (2 pgs.).

* cited by examiner

*Primary Examiner* — David Eng
(74) *Attorney, Agent, or Firm* — Holland & Hart LLP

(57) ABSTRACT

A computer-implemented method for dynamically managing the migration of a single instance of data between storage devices is described. A request to access a single instance of data stored in a storage device is received. A copy of the single instance of data is retrieved from the storage device. A determination is made as to whether a frequency of requests to access the single instance of data satisfies a threshold. The single instance of data is duplicated if the frequency of requests satisfies the threshold. The duplicated single instance of data is stored.

19 Claims, 10 Drawing Sheets

SYSTEMS AND METHODS FOR DYNAMICALLY MANAGING THE MIGRATION OF A SINGLE INSTANCE OF DATA BETWEEN STORAGE DEVICES

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Computer technologies used by consumers and by the business world continue to demand that the efficiency of these technologies increase. Users of computer systems request data in order to carry out certain functions. Demands to improve the efficiency of computer technologies have included demands to improve the techniques to retrieve data.

Retrieving data may be a time-consuming task. For example, the data requested by a user may be located on a computer system that is a great distance away from the user. The time to transmit the requested data from one computer system to another may cause the retrieval procedures to be inefficient and slow. As a result, benefits may occur by providing improved techniques to retrieve data. In particular, benefits may occur by providing systems and methods for dynamically managing the migration of data between various storage device that are located in various locations around the world.

SUMMARY

According to at least one embodiment, a computer-implemented method for dynamically managing the migration of a single instance of data between storage devices is described. A request to access a single instance of data stored in a storage device is received. A copy of the single instance of data is retrieved from the storage device. A determination is made as to whether a frequency of requests to access the single instance of data satisfies a threshold. The single instance of data is duplicated if the frequency of requests satisfies the threshold. The duplicated single instance of data is stored.

In one embodiment, a pointer to the single instance of data stored in the storage device may be stored. The copy of the single instance of data may be stored in cache for a predetermined period of time. In one example, the single instance of data may be deduplicated if the frequency of requests to access the duplicated single instance of data do not satisfy a threshold.

In addition, costs associated with storing the duplicated single instance of data may be analyzed. The single instance of data may be deduplicated if the costs associated with storing the duplicated single instance of data satisfy a threshold.

In one embodiment, the storage device is a write-once, read many (WORM) device. The duplicated single instance of data may be stored within a WORM device. In one configuration, the storage device may be a server. The storage device may be physically located in a separate location.

A server device configured to dynamically manage the migration of a single instance of data between the server and one or more additional server devices is also described. The server device may include a processor and memory in electronic communication with the processor. The server device may also include a data management module configured to receive a request to access a single instance of data stored in a second server device, and retrieve a copy of the single instance of data from the second server device. The management module may also be configured to determine whether a frequency of requests to access the single instance of data satisfies a threshold, and to duplicate the single instance of data if the frequency of requests satisfies the threshold. Further, the data management module may be configured to store the duplicated single instance of data.

A computer-program product for dynamically managing the migration of a single instance of data between storage devices is also described. The computer-program product may include a computer-readable medium having instructions thereon. The instructions may include code programmed to receive a request to access a single instance of data stored in storage device, and code programmed to retrieve a copy of the single instance of data from the storage device. The instructions may also include code programmed to determine whether a frequency of requests to access the single instance of data satisfies a threshold, and code programmed to duplicate the single instance of data if the frequency of requests satisfies the threshold. The instructions may also include code programmed to store the duplicated single instance of data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
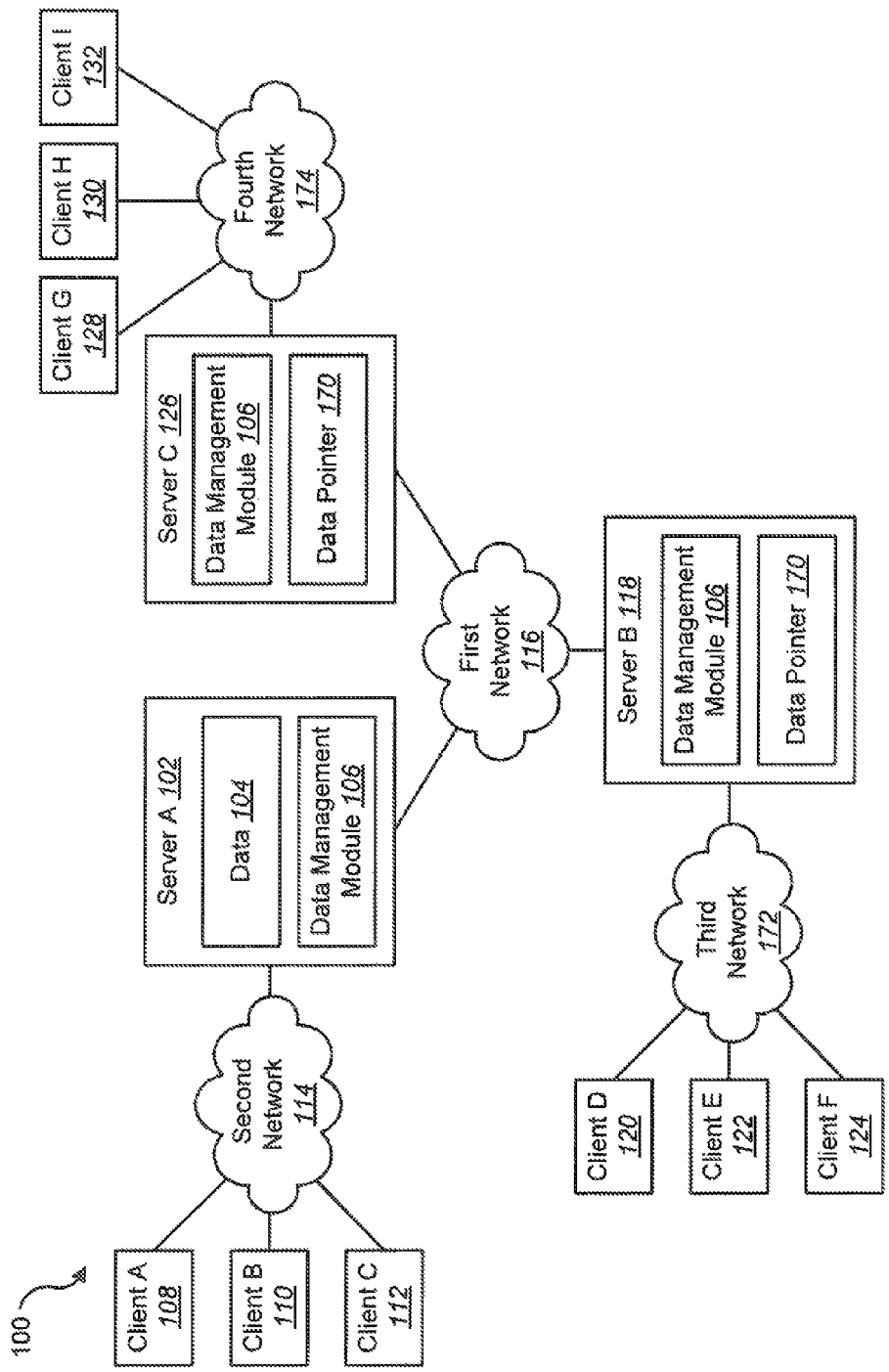
FIG. 1 is a block diagram illustrating one embodiment of a client server environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

File System Archiving (FSA) may be used by enterprises and medium sized organizations to archive content within file systems, e-mails, etc. In one embodiment, FSA may include moving files from one server that uses expensive, fast disks to servers that use less expensive, slower disks. While moving files from one location to another, FSA may single instance the data, or file, so that if the same file is being archived several times, FSA may only store the file the first time that file is seen, instead of storing the file multiple times. If a file is archived several times, a reference may be created that points to the single archived instance of the first stored file. In other words, if a file is archived one hundred times, the file may be stored only once, thus using one hundredth the amount of space that would have been used had the file been archived one hundred times. Ninety-nine references to the single stored file may be created each time the file is archived.

In some situations, a problem may occur if, for example, single instancing files is implemented between servers in various locations. For example, files may be single instanced between servers in the United States (US), the United Kingdom (UK), and India. If the same file is archived from each of these locations it may be stored only once according to a single instancing technique. In one example, the single instance of the file may be archived on a server in the UK. Users in the UK may easily retrieve the file since it is stored locally to those users. The users, however, in India and the US may have to wait while the file is transmitted a long distance from the server in the UK to an end user in the US or India. If there is only one user in the UK and one hundred users in the US that desire access to the file, then a single user is able to retrieve the file efficiently and quickly while the one hundred users in the US wait while the file is transmitted from the server in the UK to the server in the US.

A similar problem may occur in a peer disk system. For example, within a single storage pool, data may be single instanced and each block of data may be stored only once. A storage pool many only span a single local area network (LAN). In one example, data may be replicated across multiple storage pools. For example, with five storage pools, five different copies of each block of data may be created and stored. If this replication was not performed, then the performance of retrieving blocks from remote storage pools may be slow and inefficient. The present systems and methods achieve improved Single Instance Storage (SIS) systems by not replicating as much data. The present systems and methods, however, still maintain efficient retrieval performance of data by keeping individual data blocks close in proximity to an end user that may retrieve the data.

The present systems and methods provide an intelligent approach to single instancing data. For example, current systems that single instance data may store a block of data once (even thought that single stored instance of data may be used in multiple locations). As explained above, this may limit the retrieval performance when an end user (located in a different location than the data) requests access to the single stored instance of the data. The present systems and methods improve the retrieval performance by migrating the data to locations where the retrieval frequency of the data is greater. For example, if the block of data is retrieved often from a certain location, the data may be duplicated and stored at this location so that retrieval performance is improved. Data that is not retrieved frequently from a particular location may be deduplicated by deleting the data from that location. This may continue until only one copy of the data remains at the location where the retrieval frequency is the greatest. In other words, the present systems and methods migrate data from an initial location to a location where the best retrieval performance will be achieved.

FIG. 1 is a block diagram illustrating one embodiment of a client-server environment in which the present systems and methods may be implemented. In one example, multiple servers 102, 118, 126 may communicate with each other across a first network 116. While FIG. 1 illustrates three servers 102, 118, 126, more or less than three servers may be used. In one embodiment, each of the servers 102, 118, 126 may be physically located in different locations. As an example, server A 102 may be located in the United Kingdom (UK), server B 118 may be located in the United States (US), and server C 126 may be located in India.

In one embodiment, each of the servers 102, 118, 126 may include a data management module 106. The management module 106 may manage data that may be stored on or sent to a server. In addition, each of the servers 102, 118, 126 may be in communication with one or more clients. For example, server A 102 may communicate with clients 108, 110, 112 across a second network 114. Server B 118 may communicate with clients 120, 122, 124 across a third network 172. Further, server C 126 may communicate with clients 128, 130, 132 across a fourth network 174. In one embodiment, the clients may request data and/or files from their respective server.

In one configuration, a block of data 104 may be stored within one or more servers. In this example, server A 102 may store the block of data 104. Server B 118 and server C 126 may include a data pointer 170. The pointer 170 may be a reference to the data block 104 stored within server A 102. In other words, client D 120 may communicate with server B 118 across the third network 172 to request access to the block of data 104. The data pointer 170 may receive the request and server B 118 may communicate with server A 102 across the first network 116 to gain access to the data block 104. A copy of the data 104 may be transmitted from server A 102 to server B 118 across the first network 116. Server B 118 may then provide client D 120 access to the data 104 across the third network 172. In one embodiment, the data pointers 170 allow servers 118, 126 to reference data that may be stored within another server (for example, server A 102). In this manner, server B 118 and server C 126 are not required to store an identical copy of the block of data 104 that is stored on server A 102. As will be explained below, the data 104 may migrate to server B 118 and/or server C 126 depending on the frequency of requests for the data 104 that are received by server B 118 and server C 126.

Figure 2:
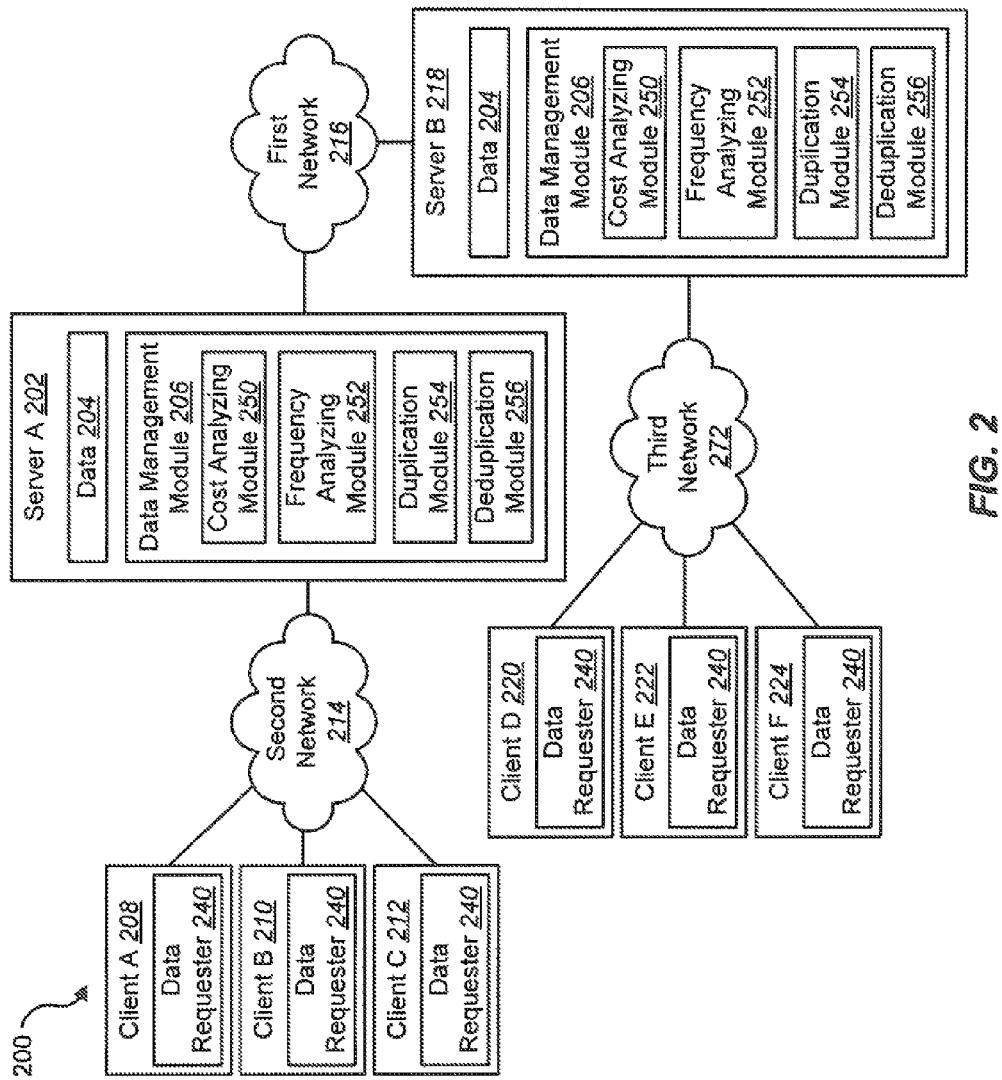
FIG. 2 is a block diagram illustrating one embodiment of a data management module managing the location of data stored on a server.

FIG. 2 is a block diagram illustrating one embodiment of a data management module 202 managing the location of a block of data 204. In one configuration, server A 202 may store the data 204 and may also include a data management module 206. Server A 202 may communicate with one or more clients 208, 210, 212 across a second network 214. Each of the clients 208, 210, 212 may include a data requestor 240 that transmits requests across the second network 214 for access to the data 204. In addition, server A 202 may communicate with server B 218 across a first network 216. Server B 218 may also include a data management module 206. In addition, server B 218 may communicate with one or more clients 220, 222, 224 across a third network 272.

In one configuration, the data management module 206 on server A 202 may include a cost analyzing module 250, a frequency analyzing module 252, a duplication module 254, and a deduplication module 256. The cost analyzing module 250 may analyze information associated with the cost of storing the data 204 on a server. For example, the cost analyzing module 250 may determine if it is economical to maintain the data 204 stored within server A 202. The frequency analyzing module 252 may analyze the frequency of requests received from clients to access the data 204. In other words, the frequency analyzing module 252 determines how often requests for the data 204 are received from one or more clients 208, 210, 212, 220, 222, 224.

In one embodiment, the duplication module 254 may duplicate data and the deduplication module 256 may eliminate data that is stored on a server. For example, if the cost analyzing module 250 and/or the frequency analyzing module 252 determine that it is inefficient for server A 202 to maintain and store a single instance of the data 204, the deduplication module 256 may deduplicate the data 204 and remove the data 204 from server A 202.

In one example, server B 218 may also include a data management module 206 with the same capabilities and functions previously described. In this example, the frequency analyzing module 252 on server B 218 may determine that a high level of requests for the data 204 (currently stored on server A 202) are received from clients 220, 222, 224. When the frequency of requests satisfies a certain threshold, the duplication module 254 may duplicate the data 204 so that server B 218 may now store its own copy of the data 204. As a result, when client D 220 sends a request across a third network 272 to server B 218 for access to the data 204, server B 218 no longer needs to request the data 204 from server A 202 because a copy of the data 204 may now stored on server B 218.

If at a later time the cost analyzing module 250 and/or the frequency analyzing module 252 determine that it would be inefficient to maintain an instance of the data 204 on a server 202, 218, the deduplication module 256 may remove or eliminate the data 204 from the appropriate server.

Figure 3:
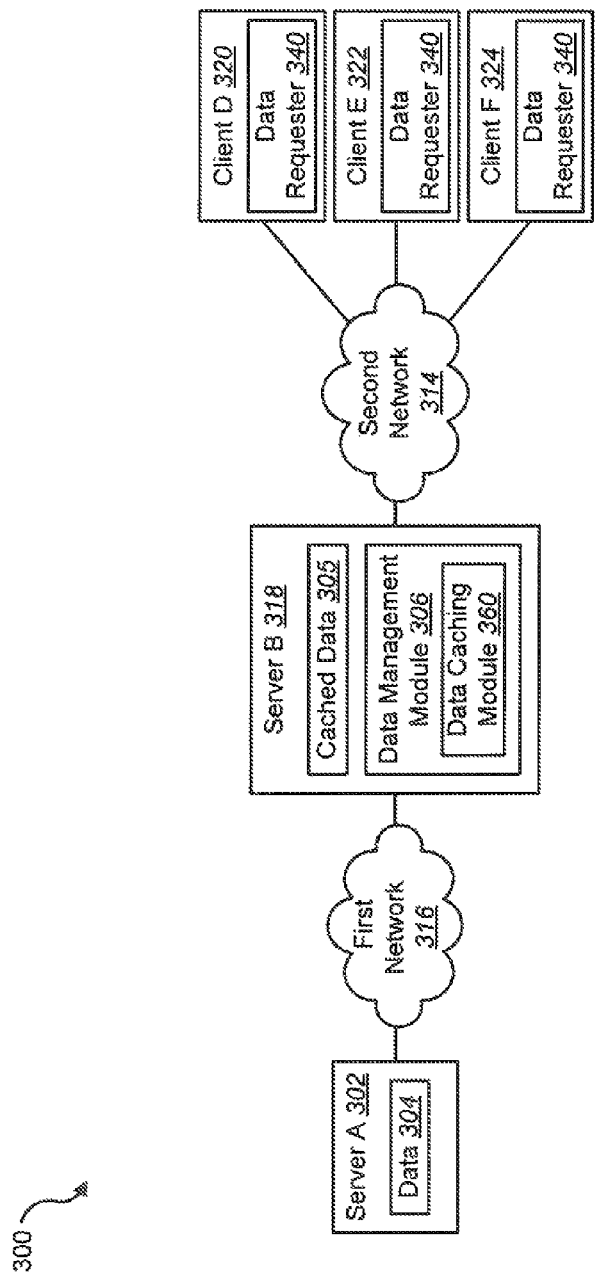
FIG. 3 is a block diagram illustrating an alternative embodiment of a client server environment where data may be cached on a server in a particular location.

FIG. 3 is a block diagram illustrating an alternative embodiment of a client-server environment where data may be cached on a server in a particular location. In one example, server A 302 may be in a first location. Server B 318 may be in a second location that may be different from the first location. Server A 302 and server B 318 may communicate with each other across a first network 316. In one embodiment, server A 302 may store a data block 304. Server B 318 may communicate with one or more clients 320, 322, 324 across a second network 314. Each of the clients 320, 322, 324 may include a data requestor 340 that may request access to the data 304. When server B 318 receives a request from one or more clients 320, 322, 324 for access to the data 304, server B 318 may request the data 304 from server A 302 across the first network 316.

Server B 318 may include a data management module 306 that includes a data caching module 360. The data caching module 360 may create cached data 305 that is a copy of the data 304. The cached data 305 may be stored within the cache of server B 318 for a predetermined period of time, for example, one week. The one or more clients 320, 322, 324 that request access to the data 304 during that predetermined period of time may gain access to the cached data 305. At the conclusion of the predetermined period of time, the cached data 305 may be emptied or removed from the cache of server B 318.

Figure 4:
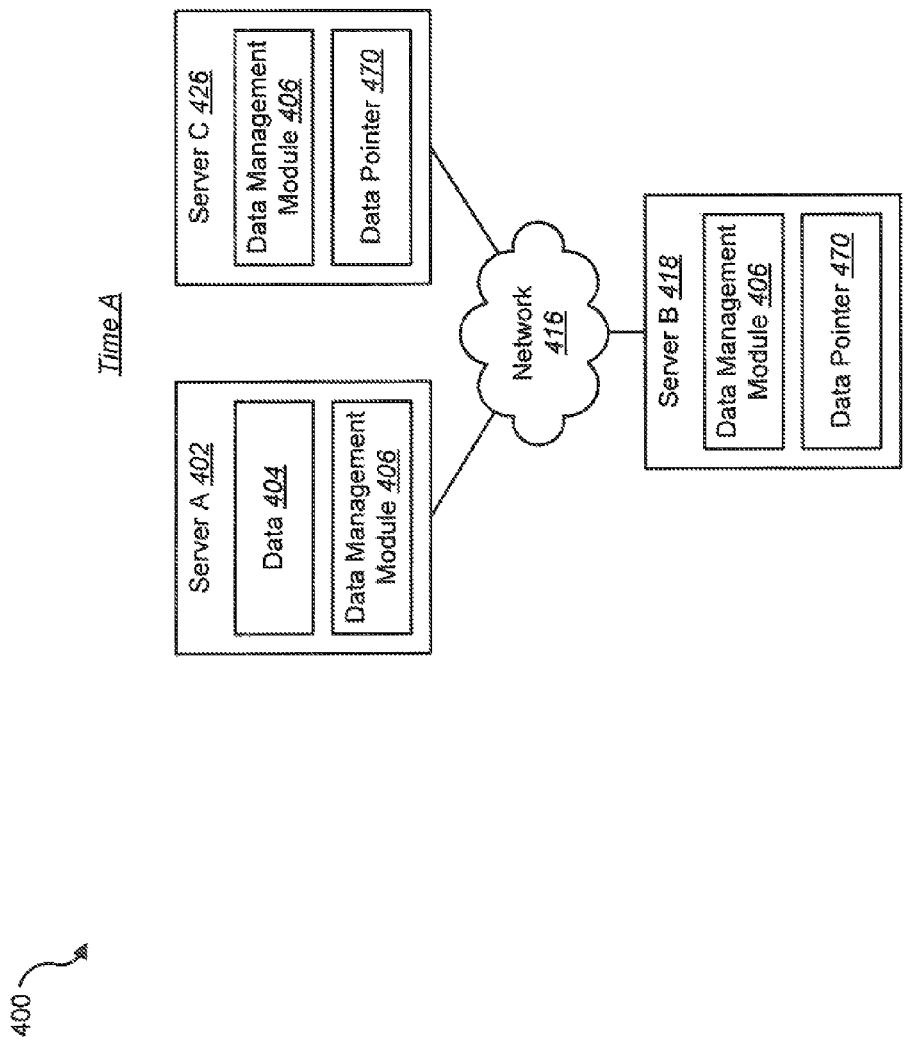
FIG. 4 is a block diagram illustrating one embodiment of multiple servers at various locations communicating with each other across a network.

FIG. 4 is a block diagram illustrating one embodiment of multiple servers 402, 418, 426 at various locations communicating with each other across a network 416. In one embodiment, server A 402, server B 418, and server C 426 may communicate with each other across the network 416. In one example, the state of the servers 402, 418, 426 illustrated in FIG. 4 may occur at a time A.

Each of the servers 402, 418, 426 may be located in different locations across the world. As an example, server A 402 may be located in the UK, server B 418 may be located in the US, and server C 426 may be located in India. Each of the servers may also include a data management module 406. In this example, server A 402 may store a single instance of a block of data 404. Server B 418 and server C 426 may include data pointers 470 that reference the data block 404 stored on server A 402.

Figure 5:
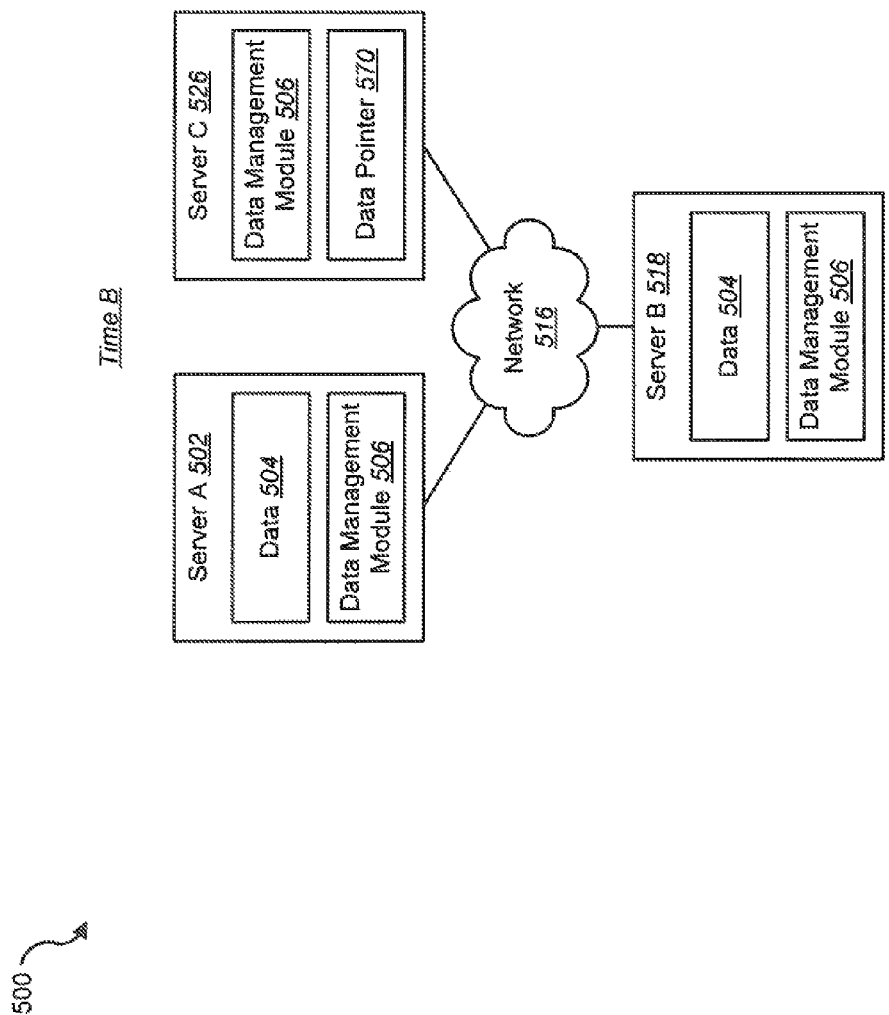
FIG. 5 is a block diagram illustrating a further embodiment of multiple servers communicating with each other across a network.

FIG. 5 is a block diagram illustrating a further embodiment of multiple servers 502, 518, 526 communicating with each other across a network 516. In one configuration, the state of the servers 502, 518, 526 illustrated in FIG. 5 may occur at a time B, which is subsequent to the time A.

In one example, server A 502 may continue to store an instance of a block of data 504. In addition, server B 518 may also store an instance of the block of data 504. In other words, the instance of data 504 previously stored only on server A 502 during time A may be duplicated and stored on server B 518 during time B. Server C 526 may continue to only store a data pointer 570 that references the instances of data 504 stored on either on server A 502 or server B 518.

As previously explained, a data management module 506 within each of the servers 502, 518, 526 may determine when to duplicate an instance of data. For example, the data management module 506 on server B 518 may determine that the frequency of requests for the data 504 received at server B 518 have reached a certain threshold. When the frequency of requests satisfies the threshold, the data management module 506 may determine to duplicate the single instance of data 504 stored on server A 502 and store the duplicated data 504 on server B 518.

Figure 6:
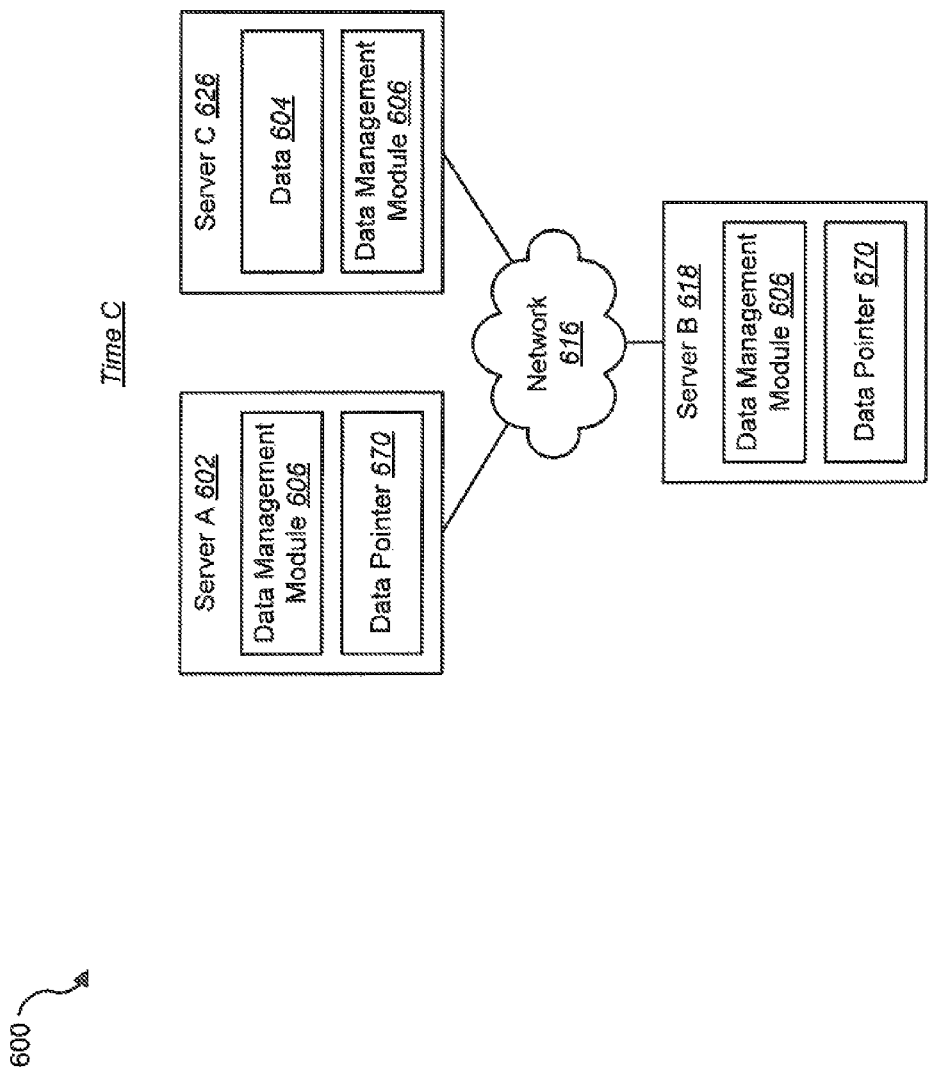
FIG. 6 is a block diagram illustrating a further embodiment of multiple servers communicating with each other across a network.

FIG. 6 is a block diagram illustrating a further embodiment of multiple servers 602, 618, 626 communicating with each other across a network 616. In one embodiment, the state of the servers 602, 618, 626 illustrated in FIG. 6 may occur at a time C which is subsequent to the time B and the time A.

In this example, server C 626 may now store an instance of a data block 604. In addition, server A 602 and server B 618 may have deduplicated the instance of data 604 that was previously stored within each of these servers during the time B. Server A 602 and server B 618 may now store data pointers 670 that reference the instance of data 604 stored on server C 626. In one embodiment, a data management module 606 within each of the servers 602, 618, 626 determines when the data 604 is to be duplicated or deduplicated from its respective server.

As illustrated in FIGS. 4-6, a single instance of data 604 originated on server A 602 at time A, migrated to server B 618 at time B, and eventually migrated to server C 226 at time C. The instance of data 604, previously stored on server A 602, may be subsequently deduplicated and removed from server A 602 during time C. In addition, as illustrated in FIG. 5, the data block 504 stored on the server B 518 may also be deduplicated and removed from server B 618 during time C. As explained previously, the data may be duplicated or deduplicated from a particular server depending on the frequency of requests received from clients communicating with a particular server in a particular location or region.

In this example, through FIGS. 4-6, users in the UK during time A were frequently requesting the data stored on server A 402. During time B, users in the US also began to frequently request access to the data. The users in the UK may also have continued to request access to the data at a high frequency. Users in India (communicating with server C 626) may not have been requesting access to the data at a high frequency during times A and B. As a result, an instance of the data may be duplicated and stored on server B 618 during time B.

In one embodiment, during time C, users in the UK and the US may have reduced the frequency of requests to access to the data block. While during time C, users in India may request access to the data 604 at a higher frequency. As a result, during time C, an instance of the data may be duplicated and stored on server C 626 while the instances of data stored on servers A 602 and B 618 may be deduplicated and removed. In one embodiment, the data 604 may eventually migrate to server C 626 from time A to time C.

Figure 7:
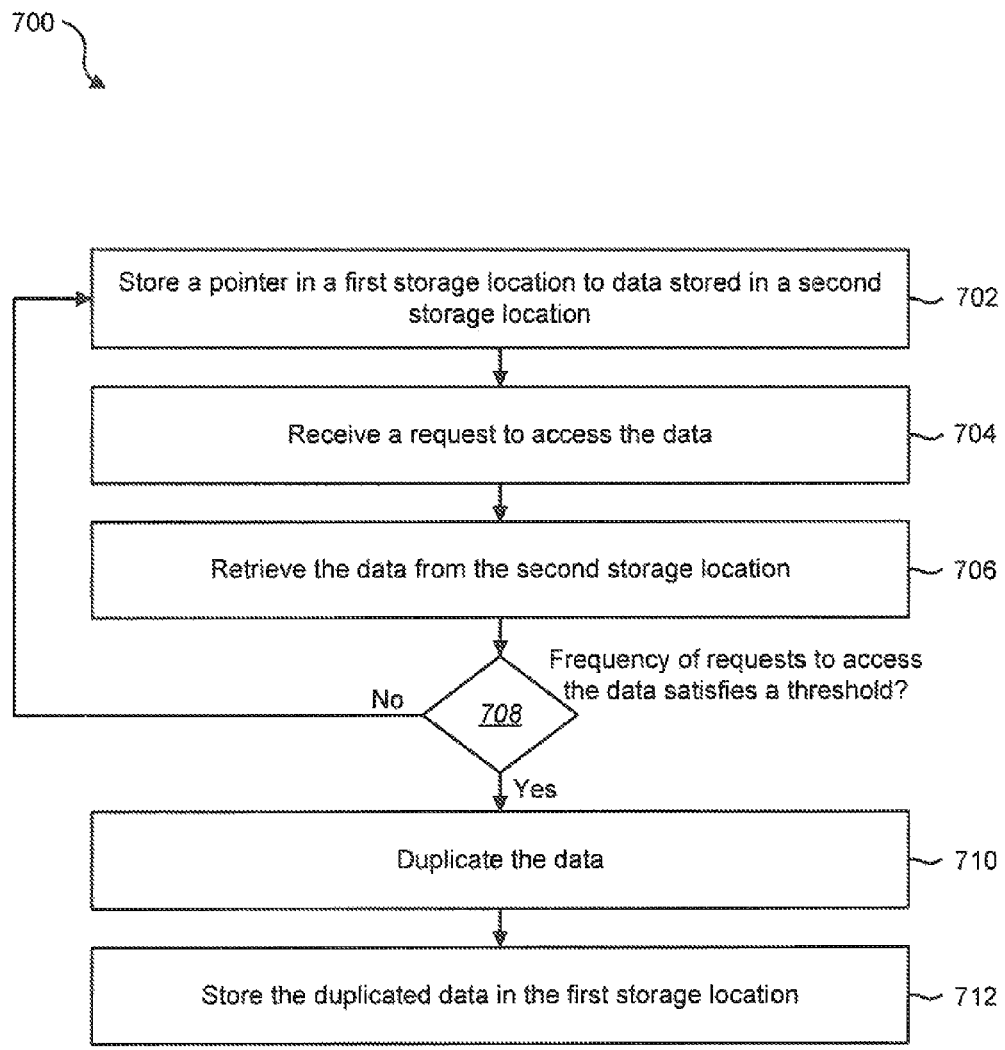
FIG. 7 is a flow diagram illustrating one embodiment of a method for dynamically managing the migration of data between storage locations or devices.

FIG. 7 is a flow diagram illustrating one embodiment of a method for dynamically managing the migration of a single instance of data between storage locations or devices. In one example, the method 700 may be implemented by a server. In particular, the method 700 may be implemented by a data management module within the server.

In one configuration, a pointer may be stored 702 in a first storage location. The pointer may be a reference to data stored within a second storage location. The first storage location and the second storage location may be servers located in different physical locations.

In one embodiment, a request to access the data may be received 704 at the first storage location. In one configuration, the request may be received 704 from a client communicating with the first storage location, such as a server. In one example, the data may be retrieved 706 from the second storage location. For example, the first storage location may communicate with the second storage location to retrieve the data.

A determination 708 may be made as to whether the frequency of requests to access the data satisfies a particular threshold. For example, a determination 708 may be made as to whether a certain number of requests for the data have been received by the first storage location over a particular period of time. If it is determined that frequency of requests for the data does not satisfy a particular threshold, the first storage location may continue to store a pointer to the data. If, however, it is determined 708 that the frequency of requests for the data does satisfy the threshold, the data may be duplicated 710 on the first storage location. In other words, the first storage location and the second storage location may now store an instance of the data.

Figure 8:
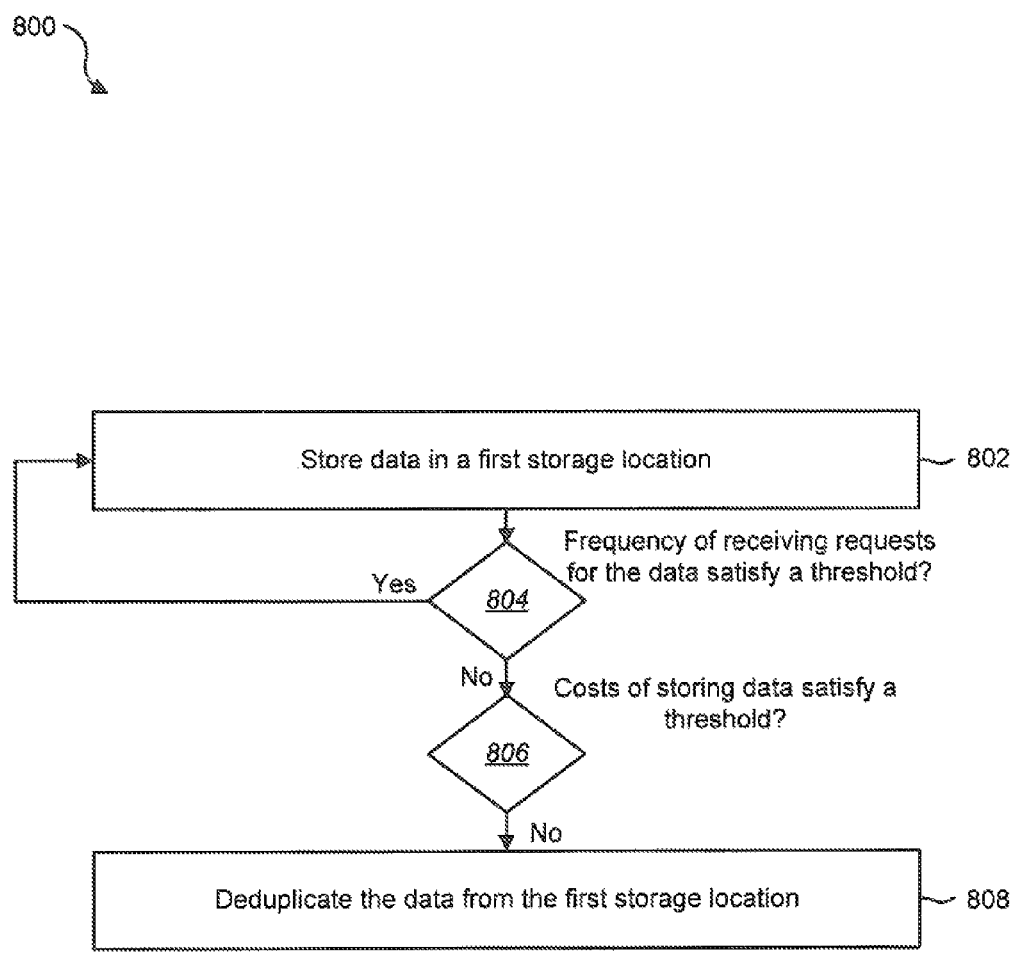
FIG. 8 is a flow diagram illustrating one embodiment of a method for managing the deduplication of data from a particular storage location.

FIG. 8 is a flow diagram illustrating one embodiment of a method for managing the deduplication of data from a particular storage location. In one embodiment, the method 800 may be implemented by a data management module within a server.

In one example, data may be stored 802 in a first storage location. A first determination 804 may be made as to whether the frequency of receiving requests for the data satisfies a particular threshold. For example, the first determination 804 may determine whether a certain number of requests for the data are received within a predetermined time period. If it is determined 804 that the frequency of requests for the data satisfies the threshold, the data may continue to be stored 802 in the first storage location. If, however, it is determined that the frequency of requests for the data does not satisfy a threshold, a second determination 806 may be made as to whether the cost of storing the data on the first storage location satisfies a threshold. For example, a data management module 106 within the first storage location may determine 806 whether it is cost efficient to continue to store the data in the first storage location. If it is determined that the costs do satisfy a threshold, the method 800 may continue to store 802 the data in the first storage location. If, however, it is determined that the costs of storing the data in the first storage location do not satisfy a threshold, the data may be deduplicated 808 from the first storage location. In other words, the data may be removed from the first storage location.

In this manner, a single instance of data may be migrated between devices or storage locations so that the data may be stored where the frequency of requests for the data is the greatest and the cost of storing the data is efficient. Instead of simply storing a block of data once on a particular location and then never storing it again on another location, the data may be duplicated and stored at a location where requests for the data frequently occur. Storing an instance of the data at a location where requests frequently occur may increase the retrieval performance for that particular location. Similarly, data blocks that have not been retrieved frequently from a particular location may be deduplicated (and removed) from that storage location. In other words, the data may be migrated from an initial storage location to another storage location that will produce increased retrieval performance of the data.

Regarding the cost analysis of storing data on a storage device, each storage device within a storage network may be assigned a weight that represents the cost per megabyte (MB) of storage data on that particular storage device. In one example, each vertex may have two weights that represent the cost per MB of transmitting data in each direction between storage devices. The weight of the vertex may be calculated dynamically by measuring how long it takes to move the data in each direction.

In one configuration, the total cost of storing the data may be summed by the following equation:

$$C=\text{sum}([\text{costofstoringdata}])+\text{sum}([\text{costoftransmittingdata}])*[\text{numberofretrievals}])$$

In other words, the value (C) may represent the cost of the disk space used to store the data plus the cost of each retrieval of the data multiplied by the number of retrievals. The present systems and methods may implement an algorithm to minimize the value (C). For example, a hill climbing algorithm may be used to minimize the value (C) by either adding in another storage location in order to reduce the cost of transmitting the data, or by removing a storage location such that the cost of transmission may be lower than the cost of storing the data.

In addition, the present systems and methods may be implemented with write-once, read many (WORM) devices.

In one embodiment, the single instance of data may be stored on a WORM device and may be duplicated on a non-WORM device. In this example, the algorithm may not be modified when deciding whether to duplicate the data on the non-WORM device. If it is determined that the frequency of requests for the data received at the non-WORM device satisfy a threshold, the data may be duplicated and stored on the non-WORM device. In one configuration, the instance of data may not be deduplicated and removed from the WORM device, even if the frequency of requests for the data at the WORM device are below a threshold.

In another embodiment, the single instance of data may be stored on a non-WORM device and then the data may be duplicated on a WORM device. The cost of storing the data on the WORM device may be modified because the data may not be deduplicated and removed from the WORM device at a later time. As a result, the value [costofstoringdata] may be calculated as the cost per unit storage space multiplied by an additional constant value. The constant value may either be hard coded based on average usage or may be updated dynamically at run time and may be based on how frequently the data should be deleted from the WORM device. Similar modifications to the algorithm may be performed when storing the single instance of data on a WORM device and duplicating the data on another WORM device.

In one embodiment, statistics indicating how often a specific block of data is retrieved may include relating the probability of retrieval of a specific block of data to the number of references to that block of data and the date the last time the block of data was stored. For example, this may be calculated as [numberofreferences]/[ageofyoungestreference]*[constant]. The value of the constant may be either hard coded based on the expected average recall rate of stored items or may be calculated dynamically as the ratio of retrievals to inserts on a specific install.

Figure 9:
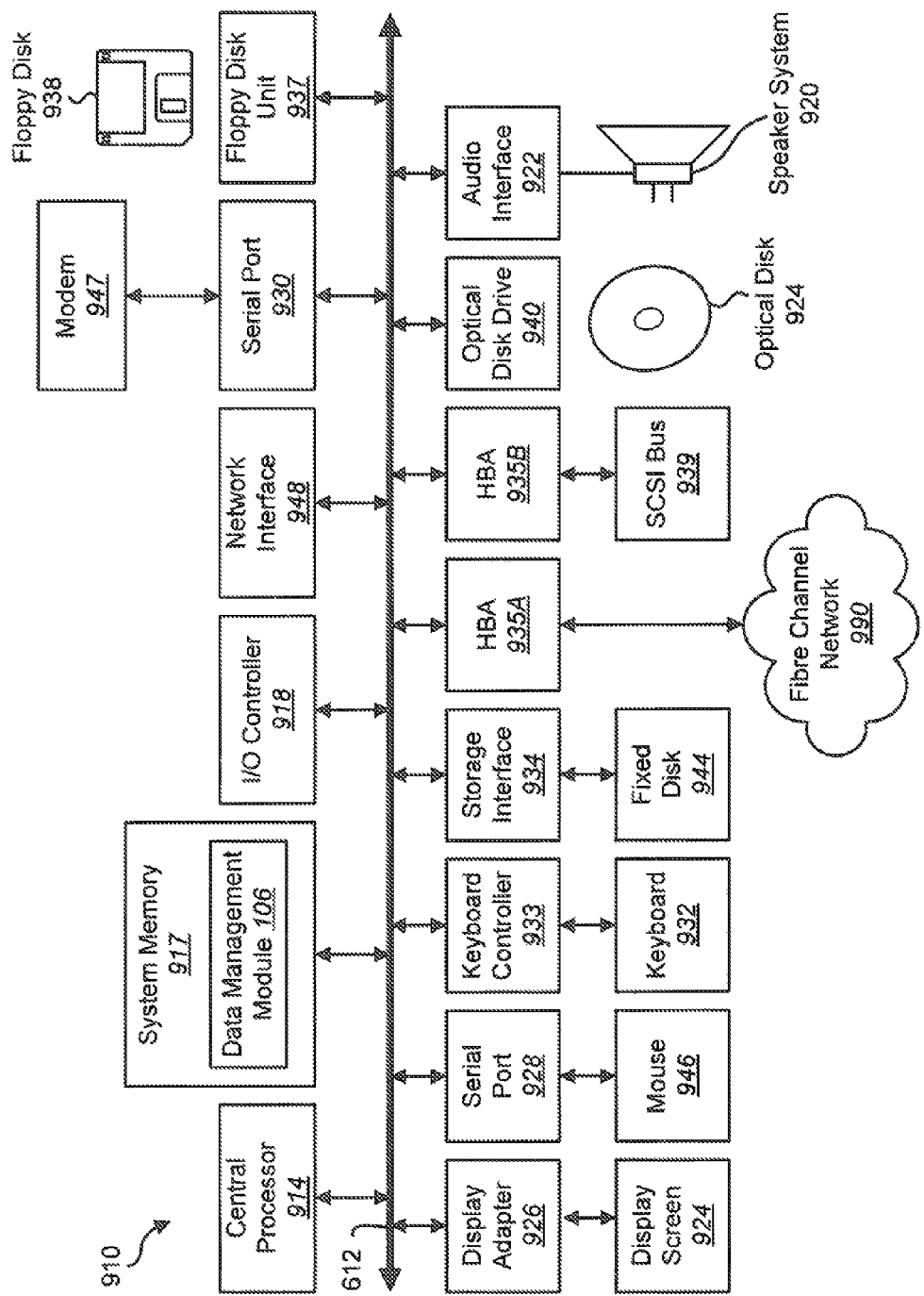
FIG. 9 depicts a block diagram of a computer system suitable for implementing the present systems and methods.

FIG. 9 depicts a block diagram of a computer system 910 suitable for implementing the present systems and methods. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the data management module 106 to implement the present systems and methods may be stored within the system memory 917. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
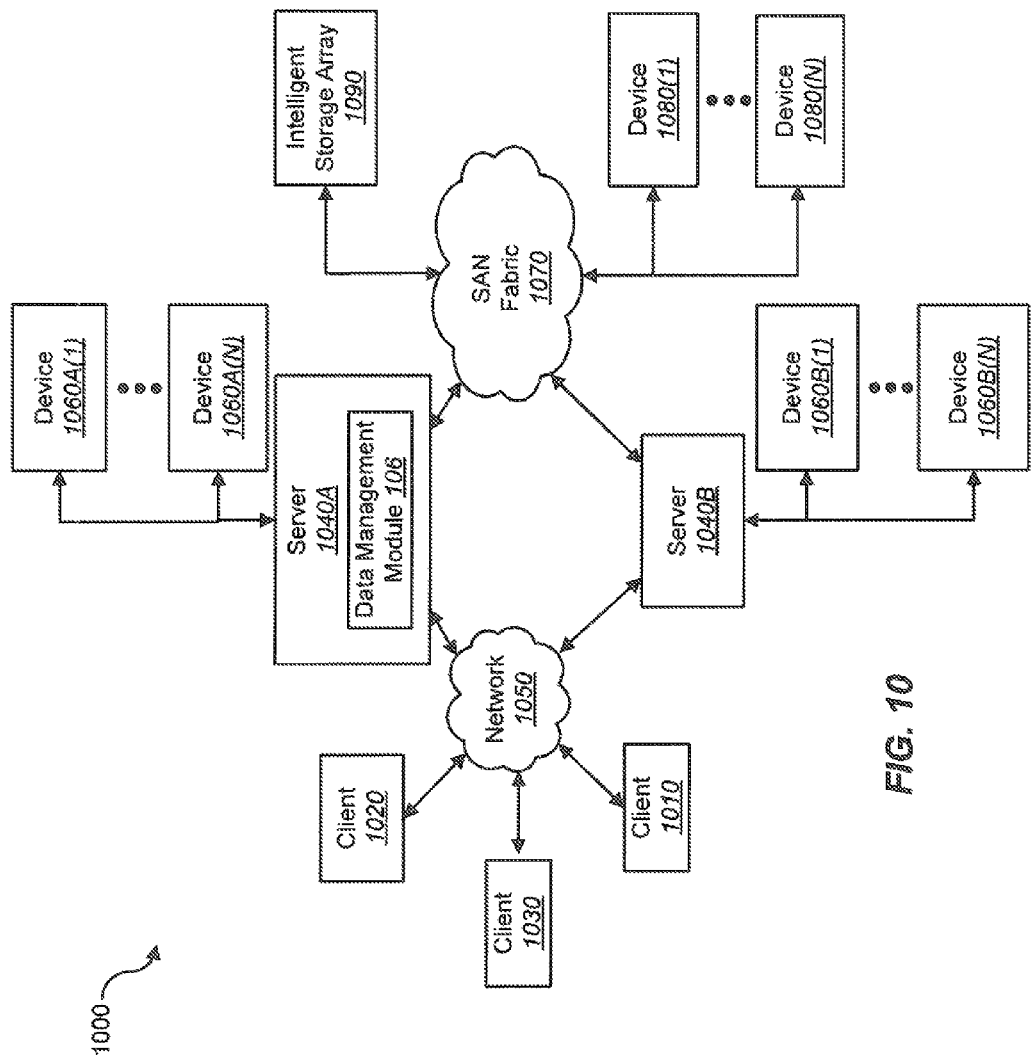
FIG. 10 is a block diagram depicting a network architecture in which client systems, as well as storage servers are coupled to a network.

FIG. 10 is a block diagram depicting a network architecture 1000 in which client systems 1010, 1020 and 1030, as well as storage servers 1040A and 1040B (any of which can be implemented using computer system 1010), are coupled to a network 1050. In one embodiment, the data management module 106 may be located within a server 1040A, 1040B to implement the present systems and methods. The storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation of the disclosure. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 720 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for dynamically managing the migration of a single instance of data between storage devices, comprising:
    receiving, by a processor at a first server, a request to access a single instance of data, wherein the single instance of data is stored at a second server;
    upon receiving the request, retrieving, by the processor, a copy of the single instance of data from the second server;
    upon determining that a first frequency of requests to access the single instance of data at the first server satisfies a threshold, duplicating, by the processor, the single instance of data at the first server;
    upon determining that a second frequency of requests to access the single instance of data at the second server fails to satisfy the threshold, removing the copy of the single instance of data from the second server;
    storing, by the processor, the duplicated single instance of data at the first server.

2. The method of claim 1, further comprising storing, by the processor, a pointer to the single instance of data stored at the second server.

3. The method of claim 1, further comprising storing, by the processor, the copy of the single instance of data in cache for a predetermined period of time.

4. The method of claim 1, further comprising deduplicating, by the processor, the single instance of data when the frequency of requests to access the duplicated single instance of data do not satisfy a frequency threshold.

5. The method of claim 1, further comprising analyzing, by the processor, financial costs associated with storing the duplicated single instance of data.

6. The method of claim 5, further comprising deduplicating the single instance of data when the financial costs associated with storing the duplicated single instance of data satisfy a cost threshold.

7. The method of claim 1, wherein the first server comprises a write-once, read many (WORM) device.

8. The method of claim 1, further comprising storing the duplicated single instance of data within a WORM device.

9. The method of claim 1, wherein the first server is physically located in a separate location from the second server.

10. A server device configured to dynamically manage the migration of a single instance of data between the server and one or more additional server devices, comprising:
    a processor;
    memory in electronic communication with the processor, wherein the memory stores computer executable instructions that, when executed by the processor, cause the processor to:
        receive a request to access a single instance of data, wherein the single instance of data is stored at a second server device;
        upon receiving the request, retrieve a copy of the single instance of data from the second server device;
        upon determining that a first frequency of requests to access the single instance of data at the first server satisfies a threshold, duplicate, by the processor, the single instance of data at the first server;

upon determining that a second frequency of requests to access the single instance of data at the second server fails to satisfy the threshold, remove the copy of the single instance of data from the second server;

store the duplicated single instance of data at the first server.

11. The server device of claim 10, wherein the processor is further configured to store a pointer to the single instance of data stored at the second server device.

12. The server device of claim 10, wherein the processor is further configured to store the copy of the single instance of data in cache for a predetermined period of time.

13. The server device of claim 10, wherein the processor is further configured to deduplicate the single instance of data when the frequency of requests to access the duplicated single instance of data do not satisfy a frequency threshold.

14. The server device of claim 10, wherein the processor is further configured to analyze financial costs associated with storing the duplicated single instance of data.

15. The server device of claim 14, wherein the processor is further configured to deduplicate the single instance of data when the financial costs associated with storing the duplicated single instance of data satisfy a cost threshold.

16. The server device of claim 10, wherein the server device comprises a write-once, read many (WORM) device.

17. The server device of claim 10, wherein the processor is further configured to store the duplicated single instance of data within a WORM device.

18. The server device of claim 10, wherein the server device is physically located in a separate location from the second server device.

19. A computer-program product comprising a non-transitory computer-readable medium having instructions thereon, the instructions, when executed by a processor, cause the processor to:

receive a request to access a single instance of data, wherein the single instance of data is stored at a second server;

upon receiving the request, retrieve a copy of the single instance of data from the second server;

upon determining that a first frequency of requests to access the single instance of data at the first server satisfies a threshold, duplicate, by the processor, the single instance of data at the first server;

upon determining that a second frequency of requests to access the single instance of data at the second server fails to satisfy the threshold, remove the copy of the single instance of data from the second server;

store the duplicated single instance of data at the first server.

* * * * *